March 18, 1958 R. A. TIEDEMANN 2,826,927
WELD ROD FEED MECHANISM
Filed Feb. 16, 1956 2 Sheets-Sheet 1
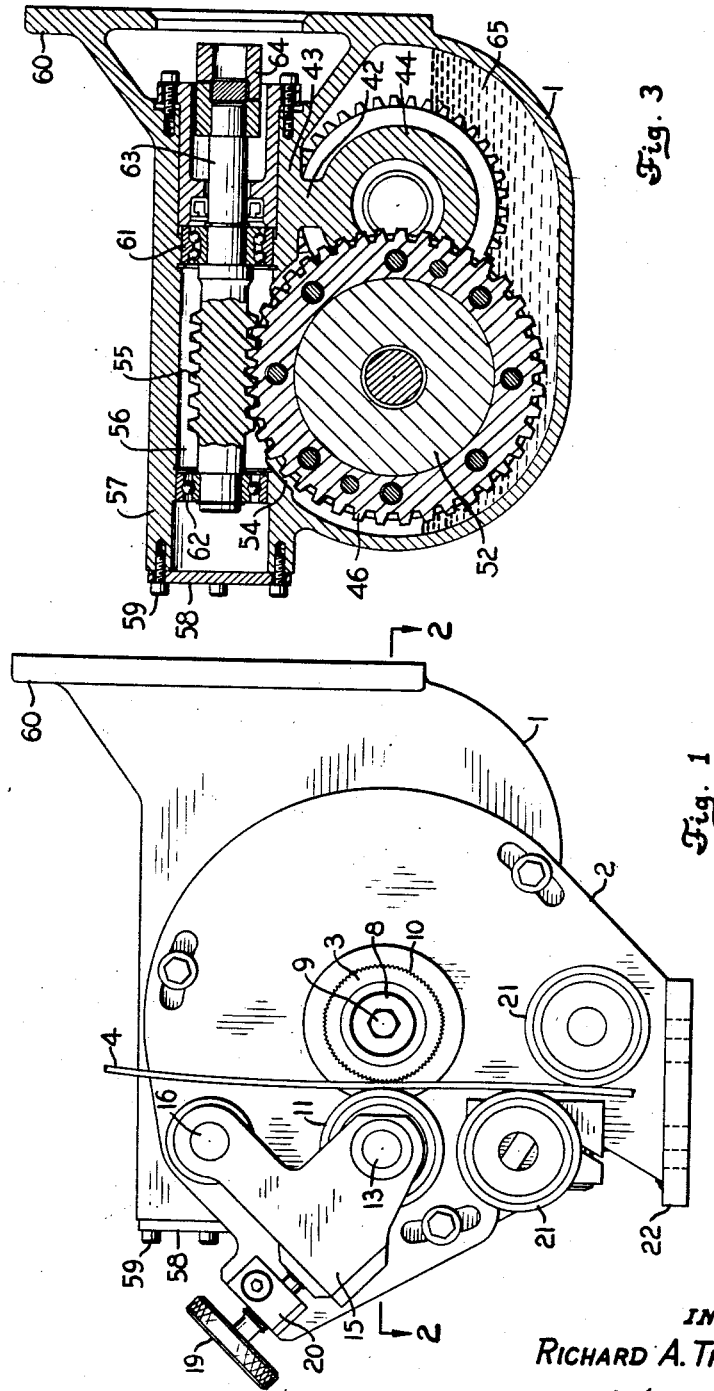
INVENTOR:
RICHARD A. TIEDEMANN
by Andrus & Scales
Attorneys March 18, 1958  R. A. TIEDEMANN  2,826,927
WELD ROD FEED MECHANISM
Filed Feb. 16, 1956  2 Sheets-Sheet 2
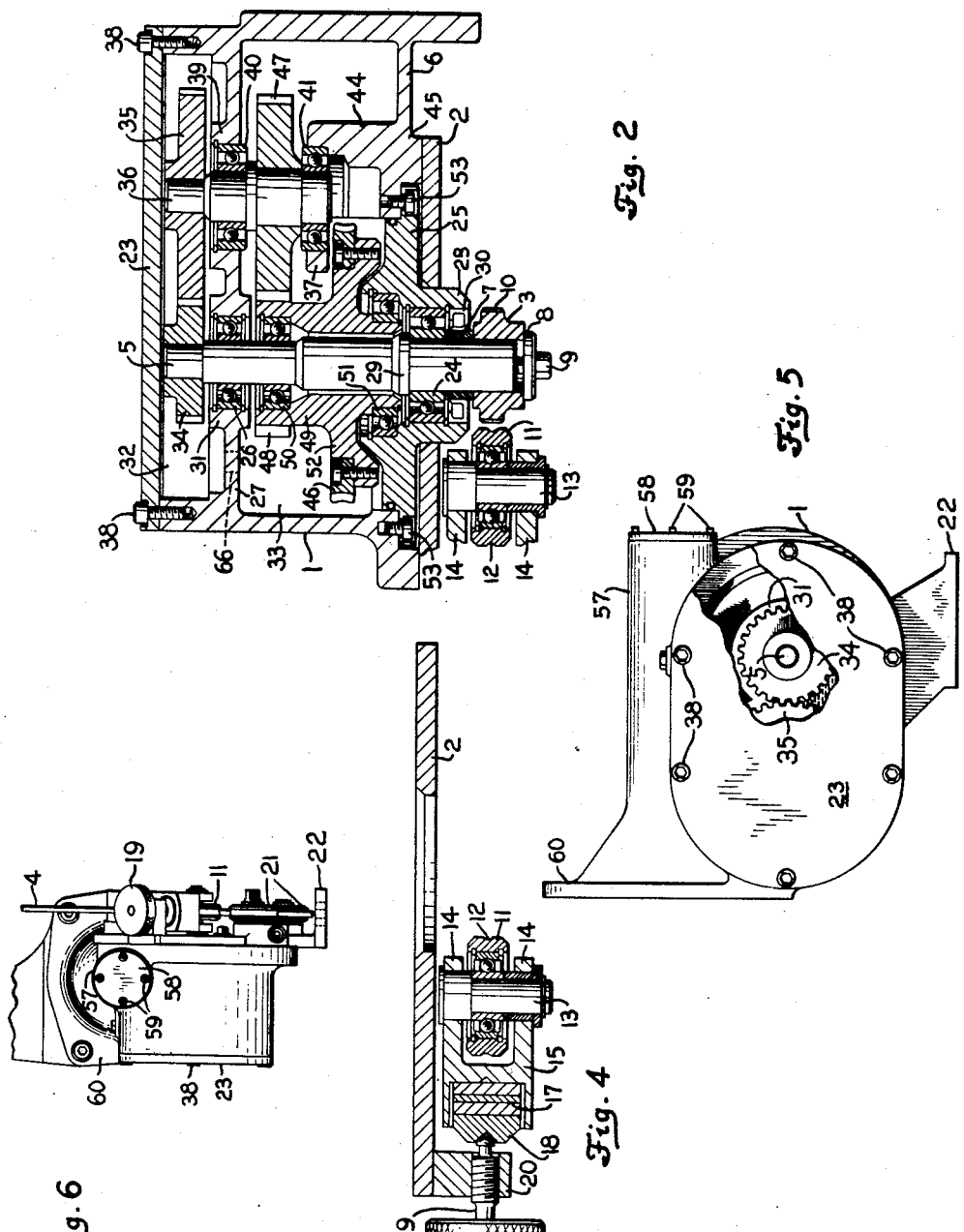
INVENTOR:
RICHARD A. TIEDEMANN

United States Patent Office 2,826,927
Patented Mar. 18, 1958

2,826,927

WELD ROD FEED MECHANISM

Richard A. Tiedemann, Milwaukee, Wis., assignor to A. O. Smith Corporation, Milwaukee, Wis., a corporation of New York Application February 16, 1956, Serial No. 565,848

5 Claims. (Cl. 74—325)

This invention relates to an arc welding head and particularly to the rod feed mechanism for an arc welding head.

Various processes of automatic arc welding are presently used in industry for the joining of metal members. The rate of feed of the electrode is generally varied for each of the various processes.

In other than the factories having mass production processes, a single welding head is generally used in a variety of processes within a factory. Consequently, the head should be easily adjusted to dispose the electrode in different positions and should also be quickly adapted to change the rate of weld rod feed required.

In accordance with the present invention, the electrode feed mechanism is connected to a prime mover through a gear system having mating gears carried on the ends of two parallel shafts. The shaft ends carrying the gears terminate adjacent a removable outer wall of a gear box. This permits fast and efficient changing of the rate of electrode feed mechanism.

To make a compact and therefore a readily adjusted welding head, the gears are disposed in overlapping relation.

The present invention provides a compact welding head having a gear system which is easily and quickly changed to vary the rate of electrode feed. Because the head is compact, it is easily adjusted to dispose the head in the desired position.

In the drawings:

Figure 1 is an elevational view of the welding head of the present invention;

Fig. 2 is a sectional view taken on line 2—2 of Figure 1;

Fig. 3 is a vertical section of the weld head;

Fig. 4 is a vertical section of an electrode biasing means shown in Fig. 1;

Fig. 5 is a reduced elevational view of the rear of the welding head showing a removable cover with a portion thereof broken away; and Fig. 6 is a reduced end view of the welding head.

Referring to the drawings, and particularly Figures 1 and 2, an arc welding head is illustrated having a gear box 1 to which an electrode straightening and driving mechanism support plate 2 is secured. The gear box 1 encloses a gear train adapted to connect an electrode drive wheel 3 and a prime mover, not shown, and thereby drive a consumable electrode 4 toward the work, not shown.

The gear train terminates with a driven shaft 5 which extends out of the forward wall 6 of the gear box 1 and has the wheel 3 secured thereto. The wheel 3 is keyed to the shaft 5 and is also clamped between a sleeve 7 on the shaft and a washer 8 which presses against the wheel. A bolt 9 threads into a central aperture in the end of the shaft and, when drawn up, tightly clamps the shaft and wheel together so that the rotation of the shaft is transmitted to the wheel. The wheel 3 is removably secured to allow interchange of various diameter or type wheels having different peripheral surfaces and thereby permit accommodation of various size and types of electrodes. The outer peripheral surface 10 of the wheel 3 is shown knurled to increase the frictional engagement between the wheel and the electrode 4 which is forced against wheel 3 by an idle or pressure roller 11. To guide and maintain the traveling electrode in position, a circumferential groove 12 is formed on the outer peripheral surface of the roller 11.

The roller 11 is journaled on a shaft 13 which extends between a pair of legs 14 in a pivoted bracket 15, as more clearly shown in Figs. 1 and 4. The bracket 15 which carries the roller 11 is generally angle-shaped having one leg pivoted on a pin 16, as shown in Fig. 1, and having the other leg bifurcated to form the legs 14. The opening in the bracket for pin 16 is reamed to provide a close fit and thereby eliminate wobble and misalignment of the roller 11. To urge the roller 11 toward the wheel 3, a resilient packing 17 and follower 18 is provided within a recess formed in the bracket opposite the legs 14. A manually adjustable set screw 19 threads through a lug 20 extending from plate 2 and bears against the follower 18 to bias the roller 11 toward the drive wheel 3 and thereby resiliently bind the electrode against the drive wheel. The line of the applied force of the set screw 19 is axially aligned with the plane of the groove 12 of the roller 11 to prevent tilting of the roller to either side.

Referring to Fig. 1, suitable straightening rollers 21 are secured to the plate 2 and the electrode is driven therebetween to straighten the electrode prior to its passage into a welding head nozzle, not shown, which is secured to the flange 22. The nozzle will vary with the welding process, thus, in the gas shielding welding process the nozzle has a concentric gas passage which is not present in the nozzle of the submerged arc process.

As previously noted, the electrode 4 is driven toward the work by the drive wheel 3 which is secured to the drive shaft 5. The shaft 5 extends rearwardly through the gear box 1 and terminates adjacent a removable back wall 23. The shaft 5 is journaled in a ball bearing 24 secured within the front wall portion 25 of wall 6 of the gear box 1 and within a ball bearing 26 secured within an intermediate wall 27.

The ball bearing 24 is pressed or otherwise secured within a hub 28 which is integrally formed with the central wall portion 25 of wall 6 extending through an aligned opening in the straightening plate 2. The bearing 24 is forced against a shoulder 29 formed on the shaft 5 by the tightening of the bolt 9 which secures the wheel 3 in place. The sleeve 7 between the wheel and bearing permits removal of the bearing from the shaft. A suitable annular seal member 30 is secured within the hub to seal the opening.

The ball bearing 26 is supported within a hub 31 formed in the intermediate wall 27. The intermediate wall 27 is spaced forwardly of and parallel to the rear wall 23 to form separate gear chambers 32 and 33 within the gear box 1. A gear 34 is keyed to the end of the shaft 5 terminating within chamber 32.

Gear 34 is driven by a second gear 35 which is keyed to an end of a second shaft 36 journaled in the intermediate wall 27 and a second bearing support wall 37. The end of shaft 36 and the gear 35 are also disposed within the chamber 32 to separate the gears 34 and 35 from the balance of the gear mechanism.

Gears 34 and 35 are quick change gears for varying the speed of the electrode feed within wide ranges. When the speed of the electrode 4 is to be changed, the back wall 23 is taken off by removing a series of bolts 38 which secure the wall 23 to the gear box proper, as most clearly shown in Fig. 5. This permits a fast and simple removal of the gears and the replacement with gears of a size and ratio to obtain the required speed of rotation of shaft 5 and consequently the speed of travel of the electrode 4.

To support the shaft 36 carrying gear 35, intermediate wall 27 is provided with a circular flange 39 which carries a ball bearing 40. Support for the shaft 36 at its opposite end is provided by the bearing support wall 37 which is generally circular. A ball bearing 41 is disposed in the center of wall 37 and the shaft 36 is journaled therein. The wall 37 is supported by an extension 42 which is formed integrally with an upper partition 43 as shown in Fig. 3.

Further strength is provided to the bearing support wall 37 by an integrally formed semi-circular wall portion 44 extending from the wall 37 to a stationary portion 45 of the front wall 6 as shown in Fig. 2. The wall portion 44 is semi-circular to allow a worm gear 46 to overlap behind the wall 37 and gear shaft 36.

The second shaft 36 is driven by a spur gear 47 which is keyed thereto between the intermediate walls 27 and 37. The spur gear 47 mates with a drive gear 48 carried by a hub 49 of the worm gear 46.

The hub 49 extends concentrically about the first shaft 5 and is rotatably supported between the intermediate wall 27 and the front wall portion 25. The rear end of the hub 49 is supported on the shaft 5 by a bearing 50 which has the inner race locked to the shaft 5 and the outer race locked within the bore of the hub 49. The opposite end of the hub 49 is journaled within a bearing 51 secured in a recess formed in the front wall portion 25.

Adjacent the forward end of hub 49, the worm gear 46 has a radially extended web portion 52 which passes between front wall portion 25 and intermediate wall 37. This overlapping relation of gear 46 behind the gear 47 and its supporting wall 37 is used to condense the size of the gear box and thereby provide a compact, easily adjusted weld head unit.

The attachment of the worm gear 46 and the drive gear 48 to the single hub 49, which is concentric with the shaft 5, also reduces the size of the gear box.

The front wall portion 25, which supports the shaft 5 and hub 49 is removably attached to wall portion 45 by a plurality of bolts 53 which pass through countersunk openings in the wall portion 25 and thread into the adjoining stationary wall portion 45. When the wall portion 25 is removed, the shaft 5 and the worm gear 46 are also removed to provide access to the interior of the gear box and to facilitate maintenance and repair.

As more clearly shown in Fig. 3, the worm gear 46 passes through an opening 54 in the upper partition 43 of the gear box and mates with a worm 55.

Referring to Figs. 3 and 6 the worm 55 is rotatably mounted within a generally tubular chamber 56 formed by the intermediate wall 43 and a curved portion 57 of the upper wall of the gear box 1. One end of the chamber 56 is closed with a cap 58 secured by a plurality of bolts 59 which are threaded into tapped openings in the adjacent gear box walls. The opposite end of chamber 56 flares outwardly and terminates in a vertical flange 60 to permit attachment of the drive motor, not shown.

The worm 55 is journaled in ball bearings 61 and 62 which are disposed within the chamber 56 to each side of the opening 54 in the horizontal intermediate wall 43. Extending rearwardly from the worm 55 is an integrally formed shaft 63 which is coupled to the motor, not shown, by a conventional shaft coupling 64.

A lubricant 65 is disposed within the gear chambers 32 and 33 and an opening 66 formed in the intermediate wall 27 provides communication between the gear chambers so that the lubricant can pass from one chamber to the other. When the gears 34 and 35 are to be changed, the gear box 1 is rotated to a horizontal position by turning of the weld head mounting means, not shown, and the lubricant drains into the forward gear chamber 33. The gears are changed and the back wall or cover 23 again bolted to the gear box 1. When the gear box is returned to a normal vertical position the lubricant 65, in part, returns to the back gear chamber 32 to lubricate the back gears.

Any other suitable lubricating system can be employed. For example, the forward chamber 33 can be sealed by eliminating the opening 66 and sealing the hubs 31 and 39 in the intermediate wall 27 and a permanent lubricant disposed in the chamber 33. Lubricant draining and filling means, not shown, would then be provided for chamber 32 and the lubricant first removed when changing gears and then replaced after the gears are changed.

In operation, the shaft 63 is coupled to a suitable prime mover such as an electric motor to rotate the worm 55. The worm 55 drives the worm gear 46 which causes rotation of the shaft 36 through the mating gear 48 and 47 carried by the worm gear hub 49 and the shaft 36, respectively. The shaft 36 drives the gear 35 which in turn rotates the shaft 5 through the mating gear 34 and thereby rotates the drive wheel 3. In cooperation with the biasing roller 11, the wheel 3 feeds the electrode 4 toward the work, not shown.

The necessary rate of electrode feed depends upon the welding process being done. For example, the gas shielded arc welding process generally requires a substantially greater electrode feed than the submerged arc welding process.

For small variations of speed within any one process the speed of the prime mover can be varied and the size of the wheel 3 can also be varied.

For the large variations, according to the present invention, the electrode feed rate is varied by changing the gear ratio between the gears 34 and 35. This is easily and quickly done by removing the cover or back wall 23 and replacing the gears 34 and 35.

The placing of the gear mechanism into two chambers 32 and 33 with the two gears to be changed by the operator located separately in one of the chambers substantially simplifies the knowledge the operator has to have to use the welding head.

The present invention provides a compact and versatile welding head which is simple to maintain and which includes a quick, efficient means to vary the electrode feed over a wide range of speeds.

Various modes of carrying out the invention are contemplated as being within the scope of the following claims particularly pointing out and distinctly claiming the subject matter which is regarded as the invention.

I claim:

1. In a weld head for feeding an electrode to a welding arc, a gear box having a front wall and a removable rear wall and an intermediate wall dividing the gear box into a front gear chamber and a rear gear chamber, all of said walls lying in substantially parallel planes, a drive wheel adapted to engage an electrode and to propel the electrode toward a workpiece, a shaft journaled within the gear box and having an extended end passing through the front wall and having a terminal end adjacent the removable rear wall to dispose the terminal end within said rear gear chamber, means to removably secure said drive wheel to the extended end of the shaft whereby the wheel is easily changed, a driven gear removably secured to the terminal end of the shaft within said rear chamber, a second shaft journaled within the gear box in spaced relation to the first shaft and having a terminal end adjacent the rear wall and within said rear chamber, a drive gear removably secured to the terminal end of the second shaft and engaging said first gear to drive the first gear whereby the speed of electrode feed is varied by changing the gear ratio of said first and second gears, and gear means disposed within said front chamber and adapted to connect the second-named shaft to a source of motive power to effect rotation of said second shaft, said gear means including a driven gear carried by a rotating hub journaled concentrically with said first named shaft.

2. An electrode drive mechanism for an automatic welding head for various automatic arc welding processes, which comprises a gear box having a removable front cover and having a removable rear cover, an intermediate wall portion in said gear box lying parallel to and spaced from the rear cover to provide a gear chamber between the rear cover and the intermediate wall, a shaft extended forwardly through the front wall to dispose one end of the shaft exteriorly of the gear box and extended rearwardly through said intermediate wall to dispose the opposite end of the shaft adjacent the rear cover, said shaft being journaled in said front wall and said intermediate wall, an electrode drive wheel removably secured to the forwardly extended shaft end to allow substitution of drive wheels having various peripheral surfaces, an adjustable pressure wheel pivotally disposed in spaced relation to the drive wheel to bias a consumable electrode against the drive wheel, a gear disposed in the gear chamber and removably secured to the rearwardly extended shaft end, a second intermediate wall portion within the gear box lying parallel to and spaced from the front cover and being disposed to one side of said shaft, a second shaft journaled in said first and second named intermediate walls within the gear box in parallel relation with the first shaft and having one end coterminous with the rear end of the first shaft and the opposite end terminating in said second intermediate wall portion, a second gear removably secured to the coterminous end of the second shaft and mated with said first named gear, said gears being interchangeable with other gears to vary the rate of feed of the electrode, and gear means connecting a motor shaft and the second named shaft to drive the second named shaft and move the electrode toward a welding arc, said gear means including a worm gear concentrically journaled about the first shaft and disposed between the front wall and the second named intermediate wall portion.

3. In an electrode feed device for automatic arc welding heads, a gear box having a removable front cover and a removable rear cover, an intermediate wall portion lying parallel to said covers to form a front and a rear gear chamber between the front and rear covers, respectively, a first shaft journaled in the intermediate wall and the front cover with the forward end of the shaft extending through the front cover and with the rear end of the shaft disposed within the rear gear chamber, an electrode mover connected to the forward end of the shaft, a gear connected to the rear end of the shaft, a second shaft journaled in the intermediate wall with the one end thereof disposed in the rear gear chamber, a gear removably secured to the second shaft within the rear gear chamber and being in mating engagement with said first named change gear to adapt the feed device for various welding operations by correspondingly changing the gear ratio, a second intermediate wall portion disposed within the front gear chamber with the forward end of the second shaft journaled therein, a spur gear secured to the second shaft between said intermediate wall portions, a worm gear disposed within said front chamber and having a hub extending to each side and being concentrically journaled about the first shaft with the outer periphery of the gear extending between said second named intermediate wall and the front cover, a worm operatively engaging the worm gear and coupled to a rotating power shaft for driving said worm and thereby turning the worm gear, and a gear secured to the outer surface of the hub and mating with said spur gear to drive the second named shaft in response to the turning of the worm gear.

4. A drive mechanism for an arc welding head for consumable electrode arc welding and adapted to connect an electrode drive member and a prime mover, comprising a casing, a first shaft journaled within the casing and having one end extending through a front wall of the casing and the other end terminating within the casing adjacent the opposite wall, a second shaft journaled within the casing in parallel relation to the first shaft and having a front end terminating generally centrally of the casing in spaced relation to the front wall, a worm gear connected to the prime mover and concentrically journaled about the first shaft and disposed between the front wall and the plane lying parallel to the front wall and containing front end of the second named shaft, and gear means operatively connecting said first and second named shafts to each other and to said worm gear.

5. An arc welding head in accordance with claim 4 wherein said worm gear has a rearwardly extending hub, and said gear means includes a drive gear secured to the outer periphery of the hub and a gear secured to said second shaft and mating with said drive gear to effect rotation of said second shaft in accordance with rotation of said worm gear.

References Cited in the file of this patent

UNITED STATES PATENTS 2,600,043     Armitage _____ June 10, 1952